(12) United States Patent
Negru et al.

(10) Patent No.: US 6,504,735 B2
(45) Date of Patent: Jan. 7, 2003

(54) REGULATED VOLTAGE REDUCING HIGH-VOLTAGE ISOLATED DC/DC CONVERTER SYSTEM

(75) Inventors: Sorin Laurentiu Negru, San Jose, CA (US); Gabriel Andreis Nicolescu, San Jose, CA (US)

(73) Assignee: 02 Micro International Ltd., Grand Cayman (GB)

( * ) Notice: Subject to any disclaimer, the term of this patent is extended or adjusted under 35 U.S.C. 154(b) by 0 days.

(21) Appl. No.: 09/971,528

(22) Filed: Oct. 5, 2001

(65) Prior Publication Data

US 2002/0126513 A1 Sep. 12, 2002

Related U.S. Application Data

(60) Provisional application No. 60/275,201, filed on Mar. 12, 2001.

(51) Int. Cl.$^7$ .............................................. H02M 3/335
(52) U.S. Cl. ........................................ 363/25; 363/97
(58) Field of Search .............................. 363/25, 26, 97, 363/134

(56) References Cited

U.S. PATENT DOCUMENTS

| | | | |
|---|---|---|---|
| 4,034,280 A | * 7/1977 | Cronin et al. .................. 363/25 |
| 4,035,710 A | * 7/1977 | Joyce ........................... 363/26 |
| 4,150,423 A | * 4/1979 | Boschert ....................... 363/97 |
| 4,783,795 A | * 11/1988 | Yahata .......................... 363/26 |
| 5,029,062 A | * 7/1991 | Capel ........................... 363/25 |
| 5,138,249 A | * 8/1992 | Capel ........................... 363/25 |
| 5,610,503 A | 3/1997 | Fogg et al. |
| 5,627,460 A | 5/1997 | Bazinet et al. |
| 5,760,671 A | 6/1998 | Lahr et al. |
| 5,844,790 A | 12/1998 | Jacobs et al. |
| 5,847,942 A | * 12/1998 | Bazinet et al. ................. 363/97 |
| 5,847,949 A | 12/1998 | Jiang |
| 5,862,042 A | 1/1999 | Jiang |
| 5,894,214 A | 4/1999 | Jiang |
| 5,914,588 A | 6/1999 | Jiang |
| 5,949,658 A | 9/1999 | Thottuvelil et al. |
| 5,999,417 A | 12/1999 | Schlecht |
| 6,058,026 A | 5/2000 | Rozman |
| 6,081,439 A | * 6/2000 | Kijima ......................... 363/26 |
| 6,104,623 A | 8/2000 | Rozman |
| 6,130,828 A | 10/2000 | Rozman |
| 6,211,579 B1 | 4/2001 | Blair |
| 6,222,742 B1 | 4/2001 | Schlecht |

OTHER PUBLICATIONS

Unitrode Design Note Dec. 1994, The Current–Doubler Rectifier: An Alternative Rectification Technique for Push–Pull and Bridge Converters.
Celestica QHS 25 Series DC/DC Converters REV AZ7.1 Jan. 22, 2001.
SynCor Quarter Brick Technical Specifications Jan. 4, 2001 PQ48033QNA25 Power Qor Quarter Brick.
Lucent Technologies DC/DC Converters May 1999 JAHW050F, JAHW075F, JAHW100F Power Modules.

* cited by examiner

*Primary Examiner*—Jeffrey Sterrett
(74) *Attorney, Agent, or Firm*—D. E. Schreiber

(57) ABSTRACT

A DC-DC converter for converting DC power received from a high-voltage DC power supply to a well-regulated output voltage that is significantly lower than the received voltage. The converter includes a regulated voltage-reduction stage which receives high-voltage DC electrical power and supplies DC electrical power at a voltage which is lower than that received. The converter also includes a separately regulated electrically isolated stage, energized by electrical power received from the voltage-reduction stage, that supplies DC electrical power to a load at the significantly lower output voltage. A feedback circuit couples an output signal from the output of the isolation-stage for regulating operation of the voltage-reduction stage and of the isolation stage.

9 Claims, 1 Drawing Sheet

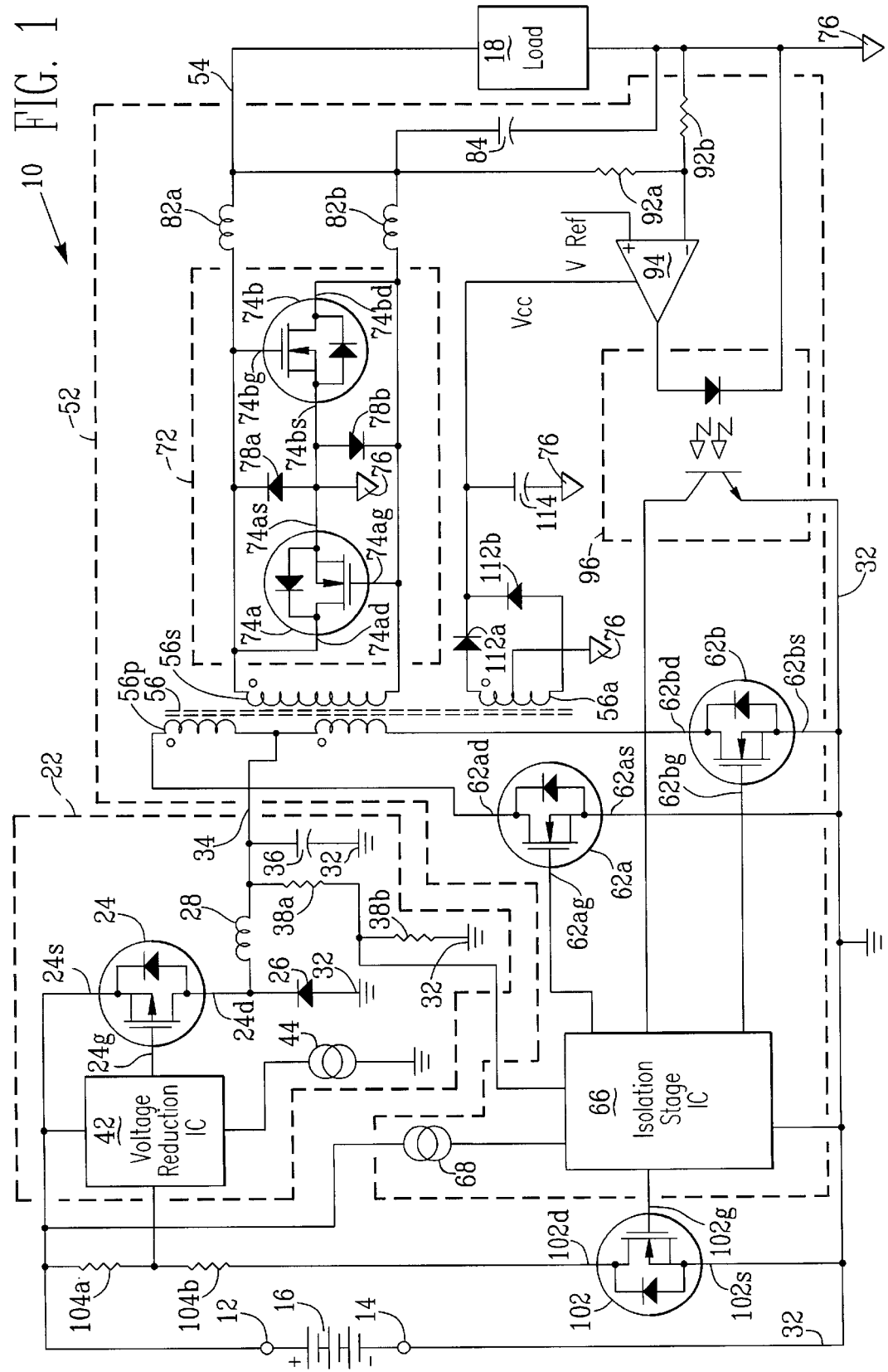

REGULATED VOLTAGE REDUCING HIGH-VOLTAGE ISOLATED DC/DC CONVERTER SYSTEM

CLAIM OF PROVISIONAL APPLICATION RIGHTS

This application claims the benefit of U.S. Provisional Patent Application No. 60/275,201 filed on Mar. 12, 2001.

BACKGROUND OF THE INVENTION

1. Field of the Invention

The present invention relates generally to DC-DC electrical power oonverter circuits, and more specifically to DC-DC power converter circuits adapted for converting electrical energy received from a high-voltage, poorly regulated electrical power source to a well regulated lower voltage.

2. Description of the Prior Art

U.S. Pat. No. 5,999,417 entitled "High Efficiency Power Converter," that issued Dec. 7, 1999, on a patent application filed by Martin F. Schlecht ("the '417 patent"), describes a DC-DC converter circuit adapted for converting electrical power received from a 48 volt direct current ("VDC") power source to a 5 VDC output voltage for energizing the operation of computer digital logic circuits. As illustrated in FIG. 1 of the '417 patent, the DC-DC converter disclosed there includes a regulation stage, an isolation stage, and control circuit that is coupled both to the regulation stage and to the isolation stage.

FIG. 2 of the '417 patent depicts as the regulation stage a conventional voltage step-down converter circuit, a/k/a/ a buck converter circuit, which receives the 48 VDC battery voltage. Within the buck converter circuit, the 48 VDC battery voltage is applied across a capacitor, $C_{IN}$, and from a first terminal of the 48 VDC battery to a switching transistor, $Q_R$. When the switching transistor, $Q_R$, turns-on, electrical current flows from the 48 VDC battery source through the switching transistor, $Q_R$, and through a series connected inductor L into the isolation stage of the DC-DC converter. During normal operation of the buck converter circuit when the switching transistor, $Q_R$, turns-off to block current from flowing from the 48 VDC battery source through the inductor L, electrical current continues to flow through the inductor L via a free-wheeling diode, $D_R$, that connects between a second terminal of the 48 VDC battery source and a junction between the inductor L and the switching transistor, $Q_R$.

A version of the isolation stage of the DC-DC converter, illustrated in FIG. 2 of the '417 patent, includes two, separate transformers T1 and T2. Each of the transformers T1 and T2 includes three windings: a primary winding $T1_{PRI}$ and $T2_{PRI}$; a secondary winding $T1_{SEC}$ and $T2_{SEC}$; and a tertiary winding $T1_{TER}$ and $T2_{TER}$. The primary windings $T1_{PRI}$ and $T2_{PRI}$ of the transformers T1 and T2 are coupled to the inductor L of the regulator stage to receive electrical current therefrom, and are coupled respectively through MOSFETs Q1 and Q2 to the second terminal of the 48 VDC battery source. Connected in this way, while either of the transistors Q1 or Q2 are turned-on, the primary windings $T1_{PRI}$ and $T2_{PRI}$ of the transformers T1 and T2 are "current fed" from the inductor L of the regulation stage. By this it is meant that the electrical current flowing into the primary windings $T1_{PRI}$ and $T2_{PRI}$ of the isolation stage transformers T1 and T2 is held relatively constant throughout a switching cycle of the DC-DC converter. It also means that voltage across the primary windings $T1_{PRI}$ and $T2_{PRI}$ of the isolation stage transformers T1 and T2 is free to have large, high frequency components.

During normal operation of the DC-DC converter, approximately one half of the switching cycle, transistor Q1 is turned-on and transistor Q2 is turned-off. While the transistor Q1 is turned-on, electrical current flows through the series connected inductor L and primary winding $T1_{PRI}$ of transformer T1. During a second half of the switching cycle, transistor Q2 is turned-on, and transistor Q1 is turned-off. While the transistor Q2 is turned-on, electrical current flows through the inductor L and through the primary winding $T2_{PRI}$ of the transformer T2 in the same manner as described above for transformer T1, While the transistor Q1 is turned-on, a positive voltage is imposed across the primary winding $T1_{PRI}$, and a magnetizing current flowing through the primary winding $T1_{PRI}$ increases. The voltage applied across the primary winding $T1_{PRI}$ and the current flowing therethrough induce a corresponding flow of electrical current (transformed by the turns ratio between the primary winding $T1_{PRI}$ and the secondary winding $T1_{SEC}$) through the secondary winding $T1_{SEC}$ of the transformer T1, and through a diode D1 connected in series with the secondary winding $T1_{SEC}$ both to an output filter capacitor $C_{OUT}$ and to a load that is coupled to the isolation stage. When the transistor Q1 turns-off thereby blocking an electrical current from flowing through the primary winding $T1_{PRI}$, the voltages across the windings $T1_{PRI}$, $T1_{SEC}$ and $T1_{TER}$ reverse thereby causing electrical current to flow through the tertiary winding $T1_{TER}$ of the transformer T1 and a diode D3 connected in series with the tertiary winding $T1_{TER}$ to the output filter capacitor $C_{OUT}$ and the load. Electrical current flowing through the tertiary winding $T1_{TER}$ of the transformer T1 provides a means to reset the core of the transformer T1, and to recover most of the magnetizing inductance energy stored in the core while the transistor Q1 is turned-on. Since as described above the transistors Q1 and Q2 operate out of phase, the transformer T2 operates similar to but out of phase with the transformer T1 for supplying electrical currents respectively through the secondary winding $T2_{SEC}$ and a diode D2, and the tertiary winding $T2^{TER}$ and a diode D4 to the output filter capacitor $C_{OUT}$ and the load.

The control circuit illustrated in FIG. 1 of the '417 patent provides drive signals to control terminals of the transistors $Q_R$, Q1 and Q2 illustrated in FIG. 2. The '417 patent explains that the separate regulation stage, which in the illustration of FIG. 1 is on the primary side of the converter's isolation stage, regulates operation of the DC-DC converter. In this particular configuration, regulation is effected by controlling the duty cycle of the transistor $Q_R$ in response to one or more parameters sensed in the control circuit, which may be sensed on the primary side of the converter's isolation stage.

A significant fraction of the energy dissipated in a DC-DC converter such as that depicted in FIG. 2 of the '417 patent occurs in the diodes D1, D2, D3 and D4, particularly if the load and/or source voltages are low, e.g. 3.3, 5, or 12 volts. To reduce this rectification conduction power loss, the diodes D1, D2, D3 and D4 may be replaced with transistors which have an on-state voltage that is much less than the conduction voltage drop of the diodes D1, D2, D3 and D4. Transistors used in this way are frequently called synchronous rectifiers, and are typically power MOSFETs for DC-DC converters switching in the 100 kHz and higher range.

FIGS. 3, 5, 6A, 6B and 7–9 of the '417 patent illustrates an isolation stage for the DC-DC converter in which a pair of N-channel MOSFET synchronous rectifiers Q3 and Q4 replace the diodes D1, D2, D3 and D4. The positions of these synchronous rectifiers Q3 and Q4 in the circuit differs slightly from the positions of the diodes D1, D2, D3 and D4 in FIG. 2. The synchronous rectifiers Q3 and Q4 still connect in series with the respective secondary winding $T1_{SEC}$ and $T2_{SEC}$, but drains of the N-channel MOSFET synchronous rectifiers Q3 and Q4 connect to the negative output terminal of the respective secondary windings $T1_{SEC}$ and $T2_{SEC}$ rather than to the positive output terminal. The synchronous rectifiers Q3 and Q4 connect in this way to the respective secondary winding $T1_{SEC}$ and $T2_{SEC}$ so source terminals of both N-channel MOSFET synchronous rectifiers Q3 and Q4 connect to a single, common DC node, i.e. circuit ground.

If instead of N-channel MOSFETS, P-channel MOSFETs were used for the synchronous rectifiers Q3 and Q4, their respective drain terminals would connect to the positive output terminals of the respective secondary winding $T1_{SEC}$ and $T2_{SEC}$ as shown in the partial schematic of FIG. 4 in the '417 patent. The configuration for the P-channel MOSFETS synchronous rectifiers Q3 and Q4 shown in FIG. 4 permit connecting the source terminals of the synchronous rectifiers Q3 and Q4 to a single, common DC node.

As shown in FIGS. 3, 4, 5, 6A, 6B and 7–9, the gates of the MOSFET synchronous rectifiers Q3 and Q4, which drains are connected respectively to the secondary winding $T1_{SEC}$ and $T2_{SEC}$, are cross-coupled to the secondary winding $T2_{SEC}$ and $T1_{SEC}$ of the opposite transformers T2 and T1. Coupled in this way, the voltage across one transformer determines the gate voltage for the opposite MOSFET synchronous rectifier, and therefore the conduction state (on or off) of the MOSFET synchronous rectifier connected to the other transformer. This configuration for the MOSFET synchronous rectifiers inherently applies properly timed driving signals to the gates of the MOSFET synchronous rectifiers without requiring any special control circuitry on the secondary side of the transformers T1 and T2.

Frequently, operation of telecommunication systems is energized by relatively high-voltage battery power supplies, e.g. 48 VDC that at times may exhibit a poorly regulated output voltage. During re-charging of these high-voltage batteries, the voltage of this power source may increase to 75 VDC for extended intervals of time, with intermittent voltage spikes reaching 100 VDC. However, the equipment energized by a DC-DC converter such as that disclosed in the '417 patent must operate continuously and reliably while the high-voltage batteries are being recharged. Thus, there exists a need for a cost-effective DC-DC converter, capable of being energized by electrical power drawn from a poorly regulated power supply, that is also capable of supplying well-regulated electrical power to equipment at a much lower voltage, e.g. 1.0–3.0 VDC, at relatively high currents, e.g. up to 60 amperes ("AMPs").

While use of high-voltage integrated circuit technology permits building a DC-DC converter having characteristics such as those outlined above, such an approach possesses several disadvantages. First, building high-voltage integrated circuits requires specialized integrated circuit manufacturing technology. A significant disadvantage of high-voltage integrated circuits made using such specialized manufacturing technology is that the integrated circuits switch slowly which increases power loss within the DC-DC converter. Moreover, high-voltage integrated circuits occupy a larger area of silicon than low-voltage integrated circuits which further increases the integrated circuits' cost.

BRIEF SUMMARY OF THE INVENTION

An object of the present invention is to provide DC-DC converter that can be energized by a poorly regulated power supply and that can supply well-regulated electrical power.

Another object of the present invention is to provide DC-DC converter that can be energized by a poorly regulated, comparatively high-voltage power supply and that can supply well-regulated electrical power at a much lower voltage, and at a high current.

Another object of the present invention is to provide a cost-effective DC-DC converter that can be energized by a poorly regulated power supply and that can supply well-regulated electrical power.

Another object of the present invention is to provide DC-DC converter using only low-voltage integrated circuit technology that can be energized by a poorly regulated, comparatively high-voltage electrical power supply and that can supply well-regulated electrical power at a much lower voltage, and at a high current.

Briefly, the present invention is a DC-DC converter adapted for converting direct current ("DC") electrical power received from first and second output terminals of a high-voltage DC power supply. The DC-DC converter is preferably adapted for supplies DC electrical power to a load at a well-regulated output voltage that is significantly lower than the voltage which the DC-DC converter receives from the high-voltage DC power supply.

The DC-DC converter includes a regulated voltage-reduction stage which receives DC electrical power from the output terminals of the high-voltage DC power supply, and supplies DC electrical power from an output at a voltage which is lower than that received from the high-voltage DC power supply. The voltage-reduction stage includes a voltage-reduction electronic switch for alternatively:

1. electrically coupling the first output terminal of the high-voltage DC power supply to the output of the voltage-reduction stage; and
2. electrically de-coupling the first output terminal of the high-voltage DC power supply from the output of the voltage-reduction stage.

The voltage-reduction stage also includes a low-voltage, voltage-reduction integrated circuit ("IC") that is energized by DC electrical power received from the output terminals of the high-voltage DC power supply. The voltage-reduction IC supplying an electrical signal to the voltage-reduction electronic switch which controls alternative electrical coupling and de-coupling effected by the voltage-reduction electronic switch. The voltage-reduction stage also includes a voltage-reduction current source that is coupled to the voltage-reduction IC to effect a controlled flow of electrical current between the output terminals of the high-voltage DC power supply through the voltage-reduction IC and the voltage-reduction current source.

The DC-DC converter also includes a separately regulated isolation stage adapted for supplying DC electrical power to the load at the output voltage that is significantly lower than the voltage which the DC-DC converter receives from the high-voltage DC power supply. The regulated isolation stage includes an isolation transformer having a primary winding that receives DC electrical power from the output of the voltage-reduction stage. The isolation transformer also has a secondary winding that is magnetically coupled to the primary winding. The regulated isolation stage includes also includes at least one transformer electronic switch connected to the primary winding of the isolation transformer. The transformer electronic switch alternatively:

1. permits electrical current to flow between the output of the voltage-reduction stage through the primary winding of the isolation transformer and the transformer electronic switch to the second output terminal of the high-voltage DC power supply; and 2. blocks the flow of electrical current between the output of the voltage-reduction stage through the primary winding of the isolation transformer and the transformer electronic switch to the second output terminal of the high-voltage DC power supply.

This operation of the transformer electronic switch induces an alternating current ("AC") in the secondary winding of the isolation transformer.

The regulated isolation stage also includes a rectifier circuit coupled to the secondary winding of the isolation transformer. The rectifier circuit rectifies the AC received from the secondary winding to produce therefrom DC electrical power which the DC-DC converter is adapted for supplying to the load. An output-voltage sensor, included in the regulated isolation stage, produces an output signal which is responsive to the output voltage supplied to the load.

A low-voltage, isolation-stage IC, included in the regulated isolation stage, is energized by DC electrical power received from the output terminals of the high-voltage DC power supply. The isolation-stage IC receives the output signal produced by the output-voltage sensor and supplies an electrical signal to the transformer electronic switch for controlling the alternative electrical coupling and de-coupling effected by the transformer electronic switch. The isolation-stage IC produces this electrical signal responsive to the output signal received from the output-voltage sensor. An isolation-stage current source included in the regulated isolation stage, is coupled to the isolation-stage IC to effect a controlled flow of electrical current between the output terminals of the high-voltage DC power supply through the voltage-reduction IC and the voltage-reduction current source.

A reduction-stage feedback circuit couples an output signal produced by the isolation-stage IC to the voltage-reduction IC to control the electrical signal which the voltage-reduction IC supplies to the voltage-reduction electronic switch.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a block diagram depicting a DC-DC converter in accordance with the present invention.

DETAILED DESCRIPTION

FIG. 1 illustrates a DC-DC converter in accordance with the present invention identified by the general reference character 10. The DC-DC converter 10 is adapted for:

1. receiving DC electrical power from a first output terminal 12 and a second output terminal 14 of a high-voltage DC battery power supply 16; and
2. supplying DC electrical power to a load 18 at a well-regulated output voltage, e.g. 1.0–3.0 VDC, that is significantly lower than a supply voltage, e.g. 30 to 75 VDC, at which the DC-DC converter 10 receives electrical power from the battery power supply 16.

The DC-DC converter 10 includes a regulated voltage-reduction stage 22, enclosed within a dashed line in FIG. 1, that receives DC electrical power from the output terminals 12, 14 of the battery power supply 16. The voltage-reduction stage 22 includes a P-type MOSFET voltage-reduction electronic switch 24 having a source terminal 24s which connects directly to the first output terminal 12 of the battery power supply 16. A drain terminal 24d of the electronic switch 24 connects to a junction between a cathode of a free-wheeling Schottky diode 26 and a first terminal of an inductor 28. An anode of the diode 26 connects to a circuit ground 32 for the voltage-reduction stage 22, which is the second output terminal 14 of the battery power supply 16. A second terminal of the inductor 28, which provides an output 34 for the voltage-reduction stage 22, connects to first terminals respectively of a filter capacitor 36 and a pair of series-connected output-voltage sensing resistors 38a and 38b. A second terminal of the capacitor 36 and a second terminal of the series-connected sensing resistors 38a and 38b both connect to circuit ground 32. Configured in this way, the electronic switch 24, inductor 28 and capacitor 36 constitute a conventional voltage reduction buck converter circuit similar to that illustrated in FIG. 2 of the '419 patent.

The voltage-reduction stage 22 also includes a low-voltage, voltage-reduction IC 42 that is energized by DC electrical power received from the battery power supply 16. Accordingly, a first power terminal of the voltage-reduction IC 42 connects directly to the first output terminal 12 of the battery power supply 16, while a second power terminal of the voltage-reduction IC 42 is coupled through a current source 44 to the second output terminal 14 of the battery power supply 16. The current source 44 effects a controlled flow of electrical current between the output terminals 12, 14 of the battery power supply 16 through the voltage-reduction IC 42. In this way, the current source 44 establishes a voltage across the low-voltage voltage-reduction IC 42 that is compatible with electrical characteristics thereof. An output terminal of the voltage-reduction IC 42 connects to a gate terminal 24g of the electronic switch 24 for supplying a signal that causes the electronic switch 24 to alternatively:

1. electrically couple the first output terminal 12 of the battery power supply 16 to the output 34 of the voltage-reduction stage 22; and
2. electrically de-couple the first output terminal 12 of the battery power supply 16 from the output 34 of the voltage-reduction stage 22.

The DC-DC converter 10 also includes a regulated isolation stage 52, enclosed within a dashed line in FIG. 1, adapted for supplying DC electrical power from an output 54 thereof to the load 18 at the output voltage that is significantly lower than the voltage which the DC-DC converter receives from the battery power supply 16. The isolation stage 52 includes an isolation transformer 56 that preferably includes a center-tapped primary winding 56p. The primary winding 56p receives DC electrical power from the output 34 of the voltage-reduction stage 22. The isolation transformer 56 also includes a secondary winding 56s that is coupled magnetically by the isolation transformer 56 to the primary winding 56p.

The isolation stage 52 also preferably includes a pair of N-type MOSFET electronic switches 62a and 62b. Each of the electronic switches 62a and 62b includes a drain terminal 62ad and 62bd that connect respectively to one side of the center-tapped primary winding 56p of the isolation transformer 56. Each of the electronic switches 62a and 62b also includes a source terminal 62as and 62bs that connect in parallel to the circuit ground 32, i.e. to the second output terminal 14 of the battery power supply 16.

The voltage-reduction stage 22 also includes a low-voltage, isolation-stage IC 66 that is energized by DC electrical power received from the battery power supply 16. Accordingly, a first power terminal of the isolation-stage IC 66 connects directly to the second output terminal 14 of the battery power supply 16, while a second power terminal of the isolation-stage IC 66 is coupled through a current source 68 to the first output terminal 12 of the battery power supply 16. The current source 68 effects a controlled flow of electrical current between the output terminals 12, 14 of the battery power supply 16 through the current source 68. In this way the isolation-stage IC 66 establishes a voltage across the low-voltage isolation-stage IC 66 that is compatible with electrical characteristics thereof. Output terminals of the isolation-stage IC 66 connect respectively to gate terminals 62*ag* and 62*bg* of the isolation-stage IC 66. The isolation-stage IC 66 supplies signals to the gate terminals 62*ag* and 62*bg* that cause the electronic switches 62*a* and 62*b* to alternatively:

1. electrically couple the second output terminal 14 of the battery power supply 16 to the output 34 of the voltage-reduction stage 22; and
2. electrically de-couple the second output terminal 14 of the battery power supply 16 from the output 34 of the voltage-reduction stage 22.

The signals which the isolation-stage IC 66 supplies to the gate terminals 62*ag* and 62*bg* cause the electronic coupling and decoupling of the electronic switches 62*a* and 62*b* to occur out of phase. In this way, at any instant in time signals from the isolation-stage IC 66 alternatively:

1. permit a flow of electrical current between the output 34 of the voltage-reduction stage 22 through one-half of the primary winding 56*p* of the isolation transformer 56 and one or the other of the electronic switches 62*a* or 62*b* to the second output terminal 14 of the battery power supply 16; and
2. block the flow of electrical current between the output 34 of the voltage-reduction stage 22 and the second output terminal 14 of the battery power supply 16 through the other half of the primary winding 56*p* of the isolation transformer 56 and one or the other of the electronic switches 62*b* or 62*a*. Arranged as described above, the DC-DC converter 10 receives DC electrical power from the output terminals 12, 14 of the battery power supply 16 through the source terminal 24*s* of the electronic switch 24 and the source terminal 62*as* and 62*bs* of the electronic switches 62*a* and 62*b*, and out of phase switching of the electronic switches 62*a* and 62*b* thereby inducing AC in the secondary winding 56*s* of the isolation transformer 56.

The voltage-reduction stage 22 also includes a rectifier circuit 72, enclosed within a dashed line in FIG. 1, that is coupled to the secondary winding 56*s* of the isolation transformer 56. Similar to the MOSFET synchronous rectifiers depicted in FIG. 6A and 6B of the '419 patent, the rectifier circuit 72 includes a pair of N-type MOSFETs synchronous rectifiers 74*a* and 74*b*. A gate terminal 74*ag* and 74*bg* of each of the synchronous rectifiers 74*a* and 74*b* connect respectively to opposite sides of the secondary winding 56*s* of the isolation transformer 56. Opposite sides of the secondary winding 56*s* connect with cross-coupled drain terminals 74*bd* and 74*ad* of the synchronous rectifiers 74*a* and 74*b*. An electrical ground 76 for the isolation stage 52, which is electrically insulated from the circuit ground 32 of the voltage-reduction stage 22 and the battery power supply 16, connects to both source terminals 74*as* and 74*bs* of the synchronous rectifiers 74*a* and 74*b*. A pair of Schottky diodes 78*a* and 78*b* connect respectively in parallel with the source terminals 74*as* and 74*bs* and the drain terminals 74*bd* and 74*ad* of the synchronous rectifiers 74*a* and 74*b*.

In addition to the rectifier circuit 72, first terminals of pair of inductors 82*a* and 82*b* connect respectively to opposite sides of the secondary winding 56*s*, and second terminals thereof connect to the output 54 of the DC-DC converter 10. A filter capacitor 84 connects between the output 54 and the electrical ground 76 of the isolation stage 52. Configured in this way, the rectifier circuit 72 rectifies AC electrical power received from the secondary winding 56*s* to produce therefrom DC electrical power which the inductors 82*a* and 82*b* and the filter capacitor 84 filter before being supplied by the DC-DC converter 10 to the load 18.

The voltage-reduction stage 22 also has an output voltage sensor that includes a pair of voltage divider resistors 92*a* and 92*b* connected in series between the output 54 and the electrical ground 76 of the isolation stage 52. An inverting input of a sense amplifier 94 connects to a junction between the resistors 92*a* and 92*b*. A reference voltage, V Ref, is applied to a non-inverting input of the sense amplifier 94. An output of the sense amplifier 94 connects through a photo-diode of an opto-coupler 96 to electrical ground 76 of the isolation stage 52. An output of the opto-coupler 96 connects to circuit ground 32 of the voltage-reduction stage 22 and the battery power supply 16, and to an input of the isolation-stage IC 66. Connected in this way the opto-coupler 96 supplies an output signal to the isolation-stage IC 66 which responds to the voltage of DC electrical power which the DC-DC converter 10 supplies to the load 18. A junction between the resistors 92*a* and 92*b* in the voltage-reduction stage 22 also connects to an input of the isolation-stage IC 66. In this way, the isolation-stage IC 66 also receives directly a signal which is proportional to the voltage present at the output 34 of the voltage-reduction stage 22.

The DC-DC converter 10 also includes a N-type MOSFET 102 which feeds a control signal from the isolation-stage IC 66 back to the voltage-reduction IC 42 for controlling the operation of the electronic switch 24. The source terminal 102*s* of the MOSFET 102 in this voltage-reduction-stage feedback circuit connects to circuit ground 32 of the voltage-reduction stage 22 and the battery power supply 16, while the gate terminal 102*g* connects to the isolation-stage IC 66. A divider formed by resistors 104*a* and 104*b* couples a drain terminal 102*d* of the MOSFET 102 to the voltage-reduction IC 42 to provide the feedback signal thereto.

When the voltage-reduction stage initially receives DC electrical power from the output terminals 12, 14 of the battery power supply 16, the voltage-reduction IC 42 generates a pulse width modulated ("PWM") electrical signal in a free wheeling mode, i.e. not fixed frequency. The voltage-reduction IC 42 supplies this PWM signal to the electronic switch 24 to effect alternative electrical coupling and de-coupling by the electronic switch 24 at a first frequency, e.g. 1.0 MHz. After a short interval of time controlled by a so called "soft start" function, the voltage at the output 34 of the electronic switch 24 becomes substantially equal to a pre-established value, e.g. 24 VDC. Upon reaching this pre-established value, the isolation-stage IC 66 and the MOSFET 102, responsive to the voltage at the output 34 of the electronic switch 24, cause the voltage-reduction IC 42 to alter the frequency of the PWM signal supplied to the gate terminal 24*g* of the electronic switch 24 to a different and fixed frequency. This second frequency, e.g. 300 KHz, differs markedly from the first frequency. The characteristics of the PWM signal supplied at the second frequency can vary slightly to maintain the voltage at the output 34 at the pre-established value.

The isolation-stage IC 66 also supplies PWM signals to the gate terminals 62*ag* and 62*bg* of both electronic switches 62*a* and 62*b*. Responsive to the signal received from the opto-coupler 96, the characteristics of the PWM signals supplied to the gate terminals 62*ag* and 62*bg* can also vary slightly to maintain a substantially constant voltage across the load 18.

Although the present invention has been described in terms of the presently preferred embodiment, it is to be understood that such disclosure is purely illustrative and is not to be interpreted as limiting. For example, the isolation transformer 56 also preferably includes a center-tapped auxiliary secondary winding 56a that provides an un-regulated, low-power source for Vcc that energizes operation the sense amplifier 94. This un-regulated, low-power source also includes a pair of diodes 112a and 112b having anodes that connect respectively to opposite ends of the center-tapped auxiliary secondary winding 56a. A junction formed by cathodes of the diodes 112a and 112b connects to a filter capacitor 114 and to the Vcc terminal of the sense amplifier 94.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A DC-DC converter adapted for converting direct current electrical power received from a first output terminal and a second output terminal of a high-voltage DC power supply, the DC-DC converter being adapted for supplying DC electrical power to a load at a well-regulated output voltage that is significantly lower than the voltage which the DC-DC converter receives from the high-voltage DC power supply, the DC-DC converter comprising:

a) a regulated voltage-reduction stage which receives DC electrical power from the output terminals of the high-voltage DC power supply for supplying DC electrical power from an output of said voltage-reduction stage at a voltage which is lower than that received from the high-voltage DC power supply, said voltage-reduction stage including:
  i. a voltage-reduction electronic switch for alternatively:
    1) electrically coupling the first output terminal of the high-voltage DC power supply to the output of said voltage-reduction stage; and
    2) electrically de-coupling the first output terminal of the high-voltage DC power supply from the output of said voltage-reduction stage;
  ii. a low-voltage, voltage-reduction that is energized by DC electrical power received from the output terminals of the high-voltage DC power supply, the voltage-reduction IC supplying an electrical signal to the voltage-reduction electronic switch which controls alternative electrical coupling and de-coupling effected by the voltage-reduction electronic switch;
  iii. a voltage-reduction current source that is coupled to the voltage-reduction IC to effect a controlled flow of electrical current between the output terminals of the high-voltage DC power supply through the voltage-reduction IC and the voltage-reduction current source;
b) a regulated isolation stage adapted for supplying DC electrical power to the load at the output voltage that is significantly lower than the voltage which the DC-DC converter receives from the high-voltage DC power supply, said regulated isolation stage including:
  i. an isolation transformer having:
    1) a primary winding that receives DC electrical power from the output of said voltage-reduction stage; and
    2) a secondary winding that is magnetically coupled to the primary winding;
  ii. at least one transformer electronic switch connected to the primary winding of the isolation transformer for alternatively:
    1) permitting electrical current to flow between the output of said voltage-reduction stage through the primary winding of the isolation transformer and the transformer electronic switch to the second output terminal of the high-voltage DC power supply; and
    2) blocking the flow of electrical current between the output of said voltage-reduction stage through the primary winding of the isolation transformer and the transformer electronic switch to the second output terminal of the high-voltage DC power supply;
  whereby AC is induced in the secondary winding of the isolation transformer;
  iii. a rectifier circuit coupled to the secondary winding of the isolation transformer for rectifying the AC received from the secondary winding to produce therefrom DC electrical power which the DC-DC converter is adapted for supplying to the load at the output voltage that is significantly lower than the voltage which the DC-DC converter receives from the high-voltage DC power supply;
  iv. an output-voltage sensor for producing an output signal which is responsive to the output voltage supplied to the load;
  v. a low-voltage, isolation-stage IC that is energized by DC electrical power received from the output terminals of the high-voltage DC power supply, the isolation-stage IC receiving the output signal produced by the output-voltage sensor and supplying an electrical signal to the transformer electronic switch for controlling the alternative electrical coupling and de-coupling effected by the transformer electronic switch responsive to the output signal received from the output-voltage sensor; and
  vi. an isolation-stage current source that is coupled to the isolation-stage IC to effect a controlled flow of electrical current between the output terminals of the high-voltage DC power supply through the voltage-reduction IC and the voltage-reduction current source; and
c) a reduction-stage feedback circuit for coupling an output signal produced by the isolation-stage IC to the voltage-reduction IC for controlling the electrical signal which the voltage-reduction IC supplies to the voltage-reduction electronic switch.

2. The DC-DC converter of claim 1 further comprising:
an inductor having a first terminal that is coupled to the voltage-reduction electronic switch, and a second terminal that is coupled to the output of said voltage-reduction stage; and
a free-wheeling diode having a first terminal that is coupled to the first terminal of the inductor, and having a second terminal that is coupled to the second output terminal of the high-voltage DC power supply.

3. The DC-DC converter of claim 2 wherein:
when said voltage-reduction stage initially receives DC electrical power from the output terminals of the high-voltage DC power supply, the electrical signal which the voltage-reduction IC supplies to the voltage-reduction electronic switch effects alternative electrical coupling and de-coupling by the voltage-reduction electronic switch at a first frequency; and after the voltage at the output of said voltage-reduction stage becomes substantially equal to a pre-established value, the electrical signal which the voltage-reduction IC supplies to the voltage-reduction electronic switch effects alternative electrical coupling and de-coupling by the voltage-reduction electronic switch at a second frequency which differs markedly from the first frequency.

4. The DC-DC converter of claim 1 wherein:

when said voltage-reduction stage initially receives DC electrical power from the output terminals of the high-voltage DC power supply, the electrical signal which the voltage-reduction IC supplies to the voltage-reduction electronic switch effects alternative electrical coupling and de-coupling by the voltage-reduction electronic switch at a first frequency; and after the voltage at the output of said voltage-reduction stage becomes substantially equal to a pre-established value, the electrical signal which the voltage-reduction IC supplies to the voltage-reduction electronic switch effects alternative electrical coupling and de-coupling by the voltage-reduction electronic switch at a second frequency which differs markedly from the first frequency.

5. The DC-DC converter of claim 1 wherein:

the primary winding of the isolation transformer is center-tapped; and said regulated isolation stage includes at least two transformer electronic switches connected to opposite halves of the center-tapped primary winding of the isolation transformer, the transformer electronic switches alternatively permitting electrical current to flow through a first or through a second half of the center-tapped primary winding between the output of said voltage-reduction stage through the respective half of the primary winding and associated transformer electronic switch to the second output terminal of the high-voltage DC power supply.

6. The DC-DC converter of claim 1 wherein the rectifier circuit is a synchronous rectifier.

7. The DC-DC converter of claim 6 wherein the output-voltage sensor includes an opto-coupler.

8. The DC-DC converter of claim 6 wherein the synchronous rectifier includes at least two MOSFETs each of which has a drain terminal and a gate terminal, the drain terminals and gate terminals of the MOSFETs being respectively directly cross-coupled to opposite ends of the secondary winding of the isolation transformer.

9. The DC-DC converter of claim 8 wherein the isolation transformer includes only a single secondary winding to opposite ends of which drain terminals and gate terminals of the MOSFETs are directly cross-coupled.

* * * * *

UNITED STATES PATENT AND TRADEMARK OFFICE
CERTIFICATE OF CORRECTION

PATENT NO. : 6,504,735 B2  
DATED : January 7, 2003  
INVENTOR(S) : Sorin Laurentiu Negru and Gabriel Andreias Nicolescu It is certified that error appears in the above-identified patent and that said Letters Patent is hereby corrected as shown below:

Title page,  
Item [75], Inventor, the name of the second inventor should read -- Gabriel Andreias Nicolescu --.  
Item [73], Assignee, should read -- O2 Micro International Ltd., Grand Cayman, Cayman Islands, B.W.I. (KY) --.

Column 9,  
Line 46, insert the abbreviation -- IC -- after the phrase "voltage-reduction."

Signed and Sealed this

Eighteenth Day of October, 2005

JON W. DUDAS  
*Director of the United States Patent and Trademark Office*